United States Patent [19]
Riley

[11] Patent Number: 6,095,059
[45] Date of Patent: Aug. 1, 2000

[54] PORTABLE SEAT ASSEMBLY

[76] Inventor: William F. Riley, 1416 Easton Dr., Lakeland, Fla. 33803

[21] Appl. No.: 09/057,248

[22] Filed: Apr. 8, 1998

[51] Int. Cl.⁷ .................................................. A47B 23/00
[52] U.S. Cl. ............................................. 108/44; 108/152
[58] Field of Search ................................ 108/44, 45, 48, 108/49, 152; 224/400, 47.31, 480

[56]      References Cited

U.S. PATENT DOCUMENTS

| | | | |
|---|---|---|---|
| 2,195,366 | 3/1940 | Haigh | 108/44 |
| 2,249,845 | 7/1941 | Mitchell . | |
| 2,394,447 | 2/1946 | Hemp | 108/44 X |
| 2,471,730 | 5/1949 | Doerr . | |
| 2,612,207 | 9/1952 | Branson . | |
| 2,718,445 | 9/1955 | Wilson | 108/44 |
| 2,720,436 | 10/1955 | Covey . | |
| 2,721,777 | 10/1955 | Willis | 108/44 |
| 3,026,142 | 3/1962 | Holloway . | |
| 3,289,611 | 12/1966 | Flanders | 108/44 |
| 3,394,666 | 7/1968 | Pearlman . | |
| 3,709,159 | 1/1973 | Oglesby, Jr. . | |
| 3,865,431 | 2/1975 | Zakhi . | |
| 4,494,465 | 1/1985 | Fick, Jr. | 108/44 |
| 5,197,381 | 3/1993 | Mells . | |
| 5,427,033 | 6/1995 | Bly . | |
| 5,462,334 | 10/1995 | Sedorcek et al. . | |
| 5,730,066 | 3/1998 | Auten et al. | 108/44 |

*Primary Examiner*—Jose V. Chen
*Attorney, Agent, or Firm*—Stein, Schifino & Van Der Wall

[57]       ABSTRACT

A portable seat assembly for removable attachment to a trunk latch of a vehicle, having a bumper comprising in combination a seat portion having an upper surface and a lower surface, a support connected to the seat portion allowing the seat portion to rest on the bumper of the vehicle in a horizontal orientation, and a hook for connecting the seat portion to the trunk latch of the vehicle.

13 Claims, 5 Drawing Sheets

PORTABLE SEAT ASSEMBLY

BACKGROUND OF THE INVENTION

1. Field of the Invention

This invention relates to portable seats and in particular to a portable seat assembly which is adapted to be removably mounted to a trunk latch of a vehicle such as a automobile or truck.

2. Description of the Background Art

Portable seats or chairs are well known and include articles such as the common folding chair, beach chairs, camp stools, and the like. Vehicle mounted and collapsible or folding seats are well known, and include seating apparatus that may be fastened to the bumper, to the lid of the trunk of an automobile, or connected to the trunk bed by complex hardware arrangements. One such type of portable chair is disclosed in U.S. Pat. No. 2,781,081 to Hynes. This type of portable chair is adapted to be removably mounted to the bumper of a vehicle such as an automobile. The chair, when not in use, is removed from the bumper and stored in a convenient place such as the trunk of the auto. However, such chairs heretofore known in the prior art, while they have exhibited the advantage of simplicity and small size by reason of the elimination of legs, have not been universally adapted for use on the wide variety of shapes and sizes of bumpers of typical vehicles.

The prior art discloses a large number of sports utility seats and other chairs. By way of example, U.S. Pat. No. 3,865,431 to Zakhi discloses a vehicle bumper seat. U.S. Pat. No. 3,994,529 to Lippert discloses a stadium seat. U.S. Pat. No. 4,781,209 to Handleman discloses a folding stadium seat.

In this respect, a seat for removable attachment to a trunk latch of a vehicle according to the present invention substantially departs from the conventional concepts and designs of the prior art, and in doing so provides an apparatus primarily developed for the purpose of removably positioning a seat on a trunk latch of a vehicle.

Therefore, it is an object of this invention to provide an improvement which overcomes the aforementioned inadequacies of the prior art and provides an improvement which is a significant contribution to the advancement of the portable seat art.

In view of the obvious shortcomings of the various portable seats, it is an object of this invention to provide a portable seat assembly which may be easily attached and removed from the trunk latch in the majority of vehicles in use today.

An additional object of the present invention is to provide a portable seat assembly that can be supported by the trunk and/or bumper of a vehicle.

Yet another object of the present invention is to provide a portable seat assembly that employs a pair of downwardly extending repositionable supports as a means for supporting the seat portion of the portable seat assembly.

Another object of the present invention is to provide a portable seat assembly where the pair of downwardly extending repositionable supports are connected to vertical stiffeners located on the lower surface of the seat portion allowing outward and inward movement of the downwardly extending repositionable supports whereby the downwardly extending repositionable supports project at different depths from the lower surface of the seat portion allowing the portable seat to adapt to different surfaces of the trunks of different vehicles.

Still another object of the present invention is to provide a portable seat assembly that uses a hook to attach to the latch of a vehicle for securing the seat portion of the portable seat assembly to the vehicle.

Another object of the present invention is to provide a portable seat assembly employing a hook that has a J-shaped portion at one end and an externally threaded portion at an opposite end.

Still another object of the invention is to provide a portable seat assembly employing a J-shaped hook that easily adjusts in depth to allow the hook to be easily attached to different trunk latches in different vehicles.

Yet still another object of the present invention is to provide a portable seat assembly having a plurality of slots located along the downwardly extending repositionable supports for ease of connection and adjustment in position of the downwardly extending repositionable supports to the stiffeners on the lower surface of the seat portion.

Another object of the present invention is to provide a portable seat assembly having a boss that fits snugly into an axial bore that goes through the upper surface of the seat portion to the lower surface of the seat portion of the portable seat assembly. The lip portion of the boss is anchored to the upper surface of the seat portion of the portable seat assembly.

Still another object of the present invention is to provide a portable seat assembly where the boss is internally threaded and is mated to the externally threaded J-shaped hook for providing an easily adjustable connection between the J-shaped hook and the seat portion of the portable seat assembly.

Another object of the present invention is to provide a portable seat assembly where the boss is externally threaded and is mated to an internally threaded standard nut.

Yet still another object of the present invention is to provide a portable seat assembly where the slots on the lower surface of the seat portion interlock with the vertical stiffeners on the downwardly extending repositionable supports resulting in stable support of the portable seat assembly.

Another object of the present invention is to provide a portable seat assembly where the seat portion is integrally formed out of a plastic material.

Still another object of the present invention is to provide a portable seat assembly where the boss is manufactured out of a metal material and/or a plastic material.

Yet still another object of the present invention is to provide a portable seat assembly where the hook is of a length to receive a lock washer and a standard nut whereby the standard nut is threadedly connected to the boss over the lock washer to lock the hook into the appropriate alignment for proper attachment to the trunk latch of the vehicle.

Another object of the present invention is to provide a portable seat assembly having an internally threaded cap for connection to the externally threaded portion of the hook above the upper surface of the seat portion of the portable seat assembly.

Still another object of the present invention is to provide a portable seat assembly where the cap is manufactured out of a metal material and/or a plastic material.

Yet still another object of the present invention is to provide a portable seat assembly where the hook is manufactured out of a metal material and/or a plastic material.

Yet another object of the present invention is to provide a portable seat assembly for removable attachment to a trunk latch of a vehicle, having a bumper comprising in combination a seat portion having an upper surface and a lower surface, a support connected to the seat portion allowing the seat portion to rest on the bumper of the vehicle in a horizontal orientation, and a hook for connecting the seat portion to the trunk latch of the vehicle.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a portable seat assembly for removable attachment to the trunk latch of the vehicle. More particularly, this invention comprises a seat portion integrally formed and positionable in a horizontal orientation with an upper surface and a lower surface. Support is provided to accommodate the different surfaces encountered in the different trunks of the different vehicles. The seat portion is connected to the trunk latch of the vehicle by a hook. The hook connects at one end to the trunk latch and at the other end to a metal insert known as a boss. The boss fits into a depression in the upper surface of the seat portion and extends into an axial bore where it receives the hook that is inserted through the lower surface of the seat portion. Both the hook and the boss are threaded for attachment to one another. The hook can be adjusted in position by rotating the hook further into the boss which allows for different height connections between the trunk latch of the vehicle and the seat portion of the present invention.

The present invention provides the user with a comfortable and reliable seating surface that is suitable for use at outdoor sporting events, whereby the user may effortlessly change into proper sporting attire. Further, the present invention allows the user to conveniently store the present invention in the trunk of the vehicle and then quickly and easily attaches the seat portion of the present invention through the use of a hook to the trunk latch of a vehicle.

Among other things, the present invention is useful for the following purposes: changing socks and shoes, tallying scores, applying protective bandages, tending to physical injuries, or merely observing a game. For example, a golfer can quickly and easily attach the seat portion of the present invention through the use of a hook to the trunk latch of a vehicle; sit on the seating surface of the seat portion; and then comfortably remove or place his spikes onto his feet.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

DETAILED DESCRIPTION OF THE PREFERRED EMBODIMENT

Figure 1A:
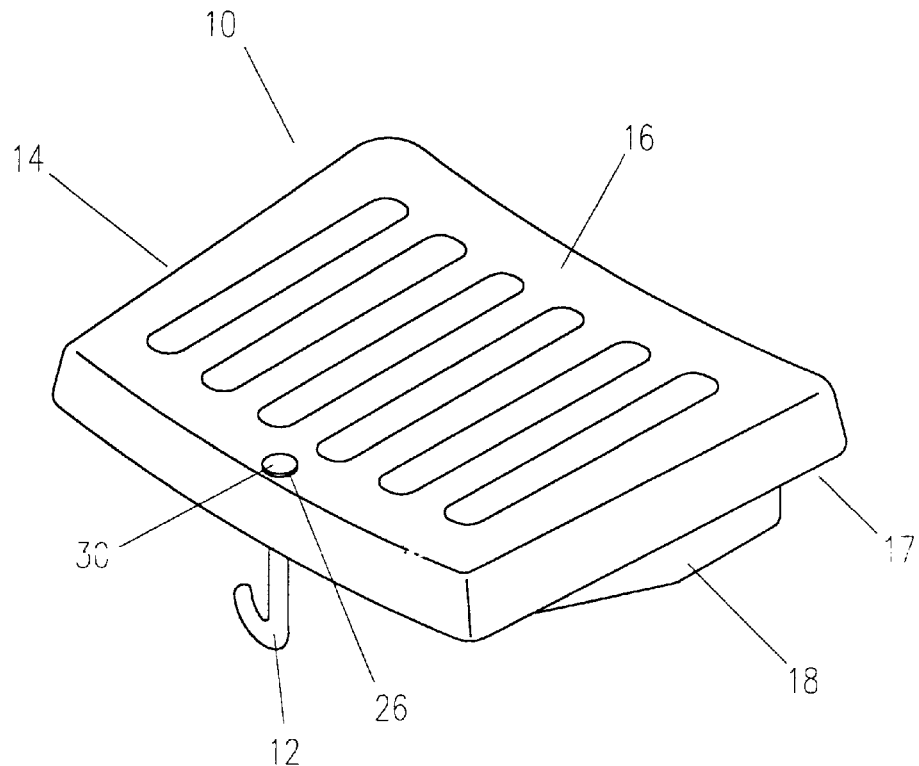
FIG. 1A is a top elevation view of the portable seat assembly of the first embodiment of the present invention illustrating the seat portion with the J-shaped hook extended and capped.
Figure 1B:
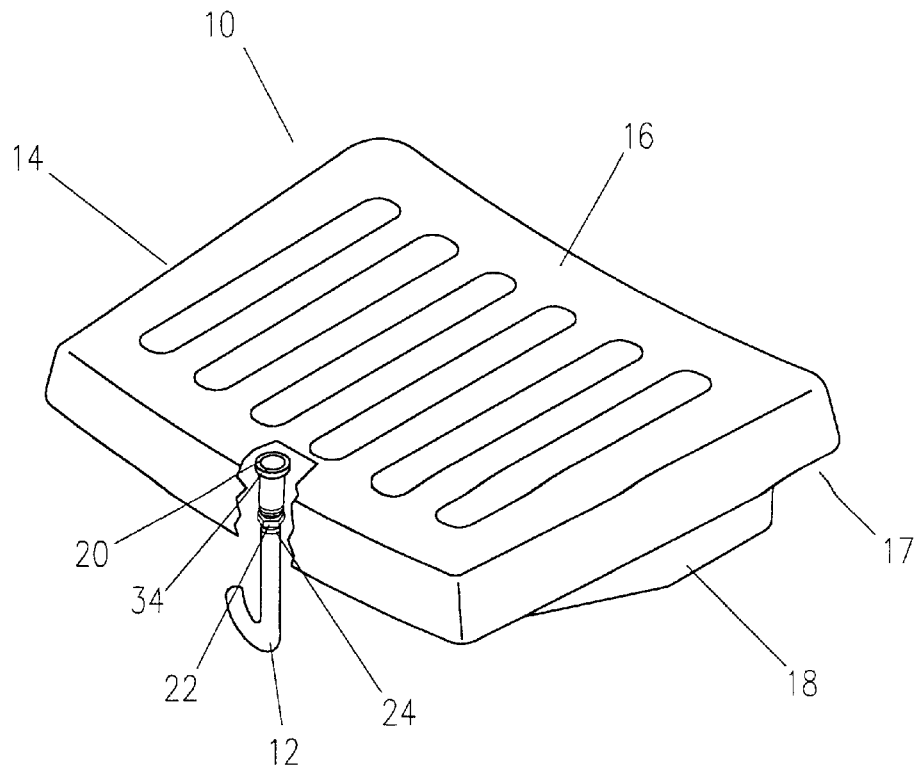
FIG. 1B is a top elevation view of the portable seat assembly of the first embodiment of the present invention illustrating the seat portion with the J-shaped hook extended and uncapped.

With reference to the drawings, FIG. 1A shows the first embodiment of the portable seat assembly 10 of the invention. The portable seat assembly has a seat portion 14 providing the seating surface for the portable seat assembly 10. The seat portion 14 has an upper surface 16 and a lower surface 17. Also shown in FIG. 1A is support 18 attached to the lower surface 17 of the seat portion 14. A hook 12 extends below the lower surface 17 of the seat portion 14. As shown in FIG. 1A, a cap 30 is located on the upper surface 16 of the seat portion 14 for covering a recess 26 and attaching to the hook 12. As best shown in FIG. 1B, the first embodiment of the present invention 10 has the hook located within an axial bore 34 and the hook 12 is connected to a boss 20.

Figure 1C:
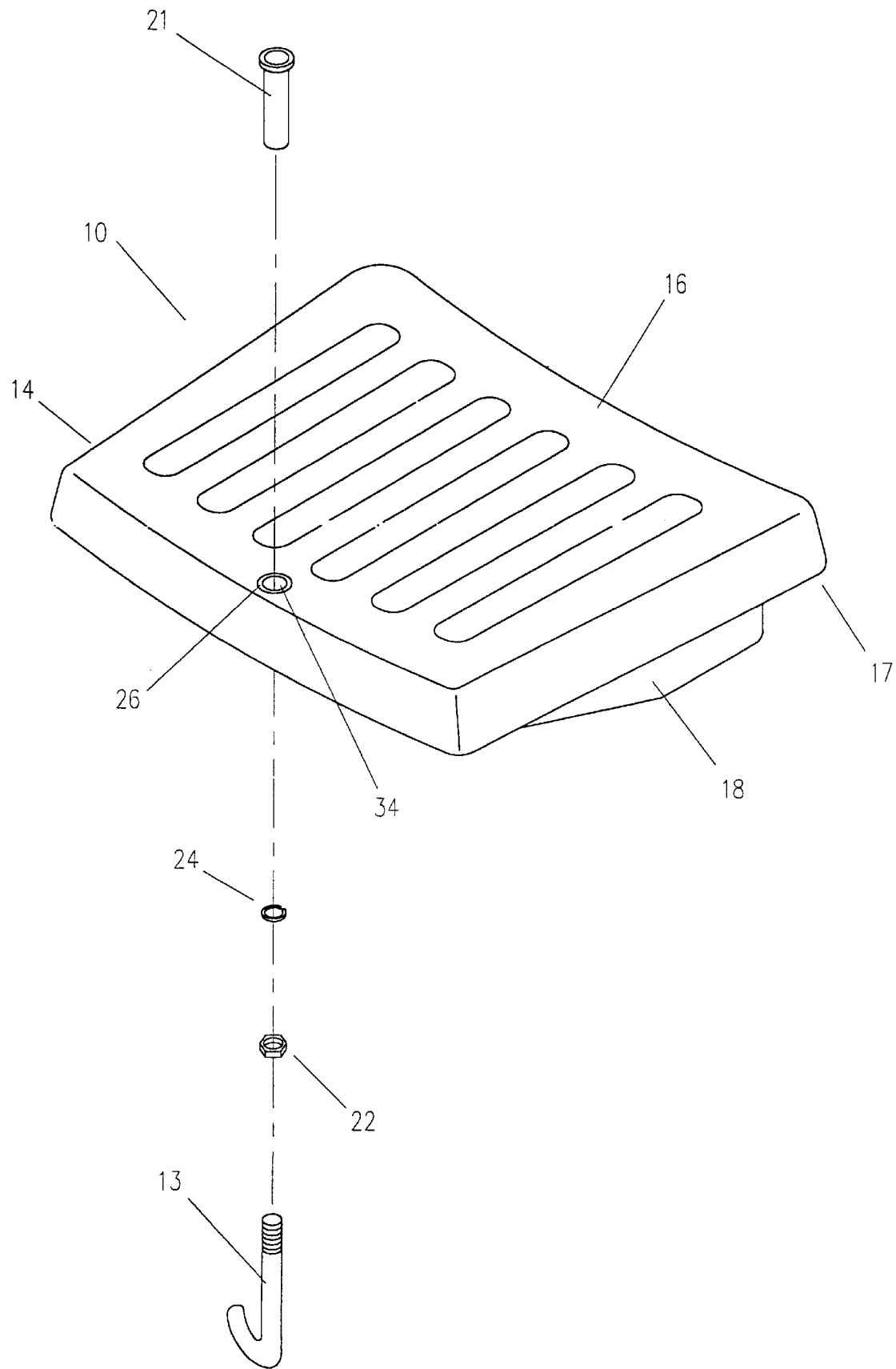
FIG. 1C is an exploded view of the second embodiment of the present invention with a J-shaped hook illustrating the connecting components.

Referring to FIG. 1C, which is an exploded view of the second embodiment of the present invention 10 illustrating the connecting components between a threaded hook 13 and the seat portion 14. The threaded hook 13 is connected to the seat portion 14 through an internally threaded boss 21 which is inserted into the recess 26 in the upper surface 16 of the seat portion 14. The recess is located at the top of the axial bore 34 which provides the through hole from the upper surface 16 of the seat portion 14 to the lower surface 17 of the seat portion 14. A standard nut 22 and a lock washer 24 are provided to strengthen the connection between the threaded hook 13 and the internally threaded boss 21.

Figure 2:
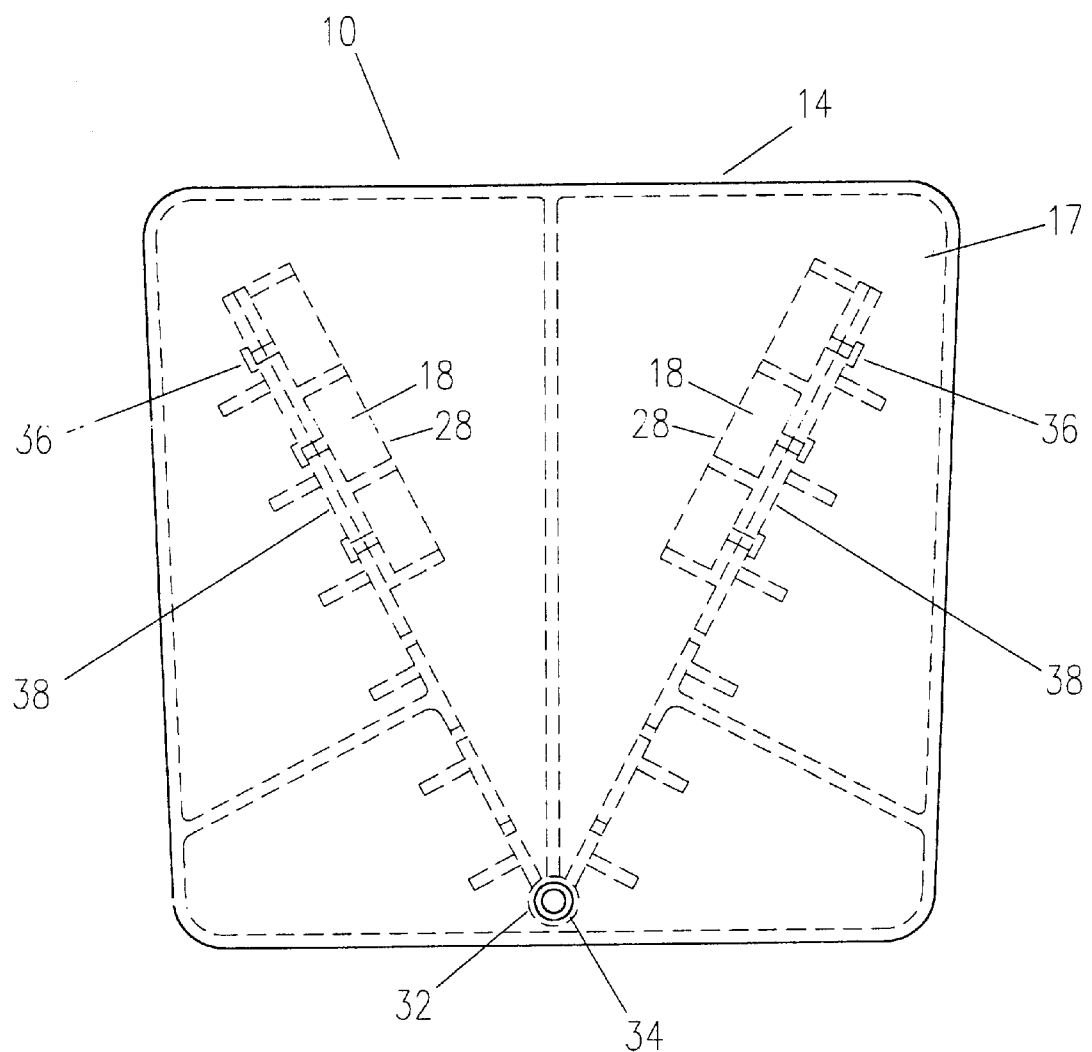
FIG. 2 is a top elevation view of the portable seat assembly of the present invention illustrating the downwardly extending repositionable supports in an open position.

As best shown in FIG. 2, the support 18 is located on the lower surface 17 of the seat portion 14. In this second embodiment, the support 18 comprises a pair of downwardly extending repositionable supports 28. The downwardly extending repositionable supports 28 are attached to a plurality of vertical stiffeners 38. The plurality of vertical stiffeners 38 are located on the lower surface 17 of the seat portion 14. The plurality of vertical stiffeners 38 allow outward and inward movement of the downwardly extending repositionable supports 28 relative to the seat portion 14. Therefore, the downwardly extending repositionable supports 28 are able to project at different depths from the lower surface 17 of the seat portion 14 as the downwardly extending repositionable supports 28 are positioned along the plurality of vertical stiffeners 38. The projection of the downwardly extending repositionable supports 28 allows the present invention 10 to be adapted to different surfaces of the trunks of different vehicles.

Also shown in FIG. 2, the lower surface 17 of the seat portion 14 having a plurality of slots 36 for receiving the downwardly extending repositionable supports 28. The plurality of slots 36 lock the downwardly extending repositionable supports 28 into proper alignment in relation to the bumper of the vehicle 50 allowing the present invention 10 to be properly secured to the trunk latch 40 of the vehicle 50 as shown in FIGS. 3B and 4B.

Figure 3A:
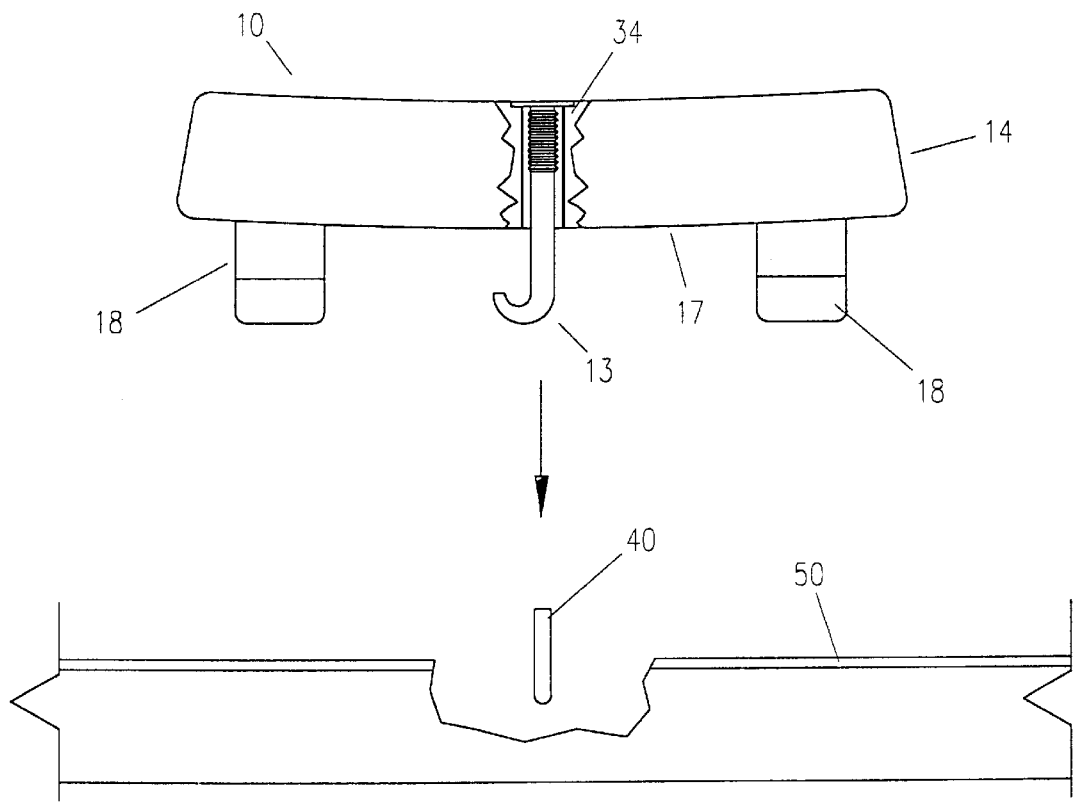
FIG. 3A is a front elevation view of the portable seat assembly illustrating the trunk latch of a typical vehicle before the connection of the portable seat assembly.
Figure 3B:
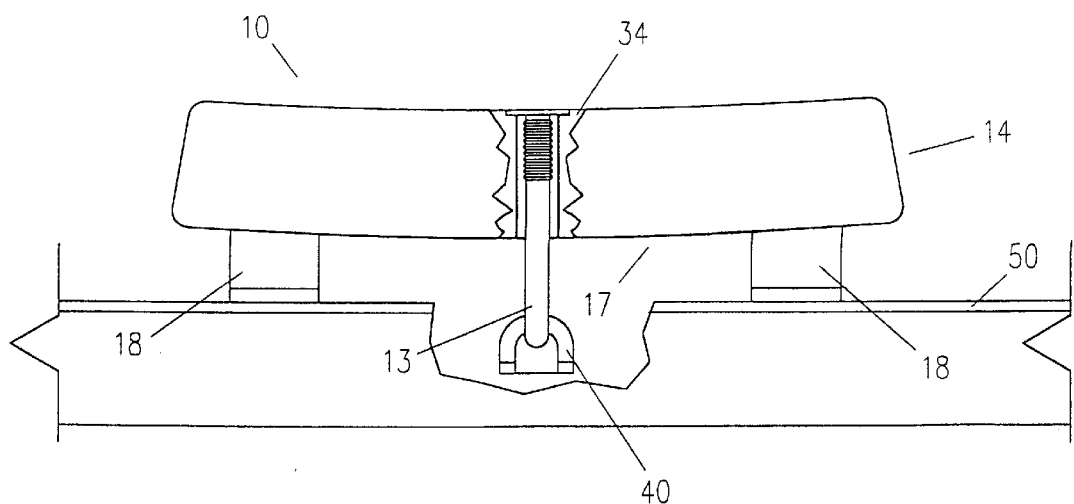
FIG. 3B is a front elevation view of the portable seat assembly illustrating the trunk latch of a typical vehicle after the connection of the portable seat assembly.

As shown in FIG. 3A, the present invention 10 is positioned above a cut away view of the trunk latch 40 of the vehicle 50. A cut away view of the threaded hook 13 within the axial bore 34 is also shown in FIG. 3A. The threaded hook 13 extends below the lower surface 17 of the seat portion 14 for connection to the trunk latch 40 of the vehicle 50. Support 18 located on the lower surface 17 of the seat portion 14 is shown positioned above the vehicle 50 in FIG. 3A. Whereas, FIG. 3B shows a cut away view of the threaded hook 13 of the present invention 10 attached to the trunk latch 40 of the vehicle 50. The support 18 is shown resting on the bumper and the trunk of the vehicle 50.

Figure 4A:
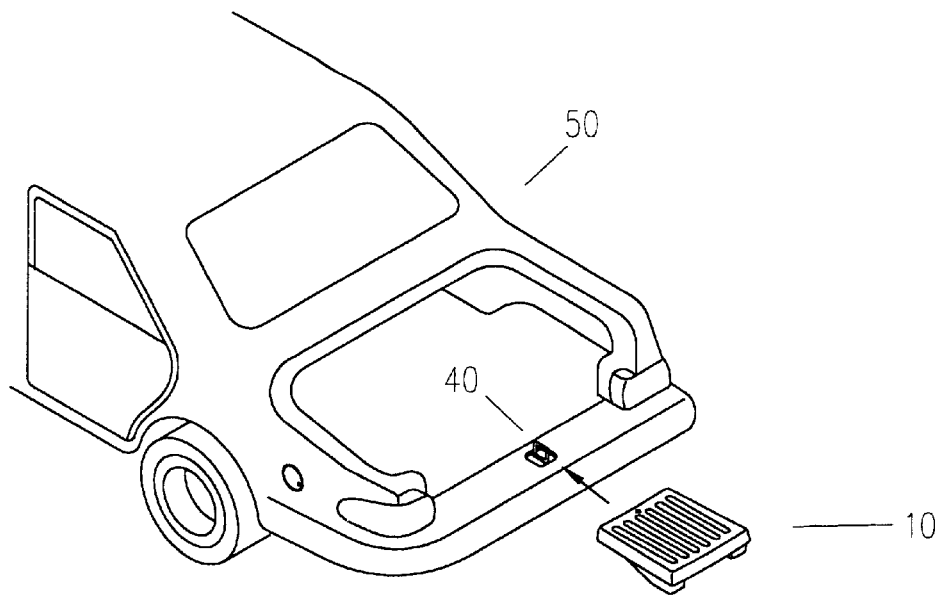
FIG. 4A is a perspective view of the portable seat assembly illustrating the trunk latch and the trunk of a typical vehicle before the connection of the portable seat assembly.
Figure 4B:
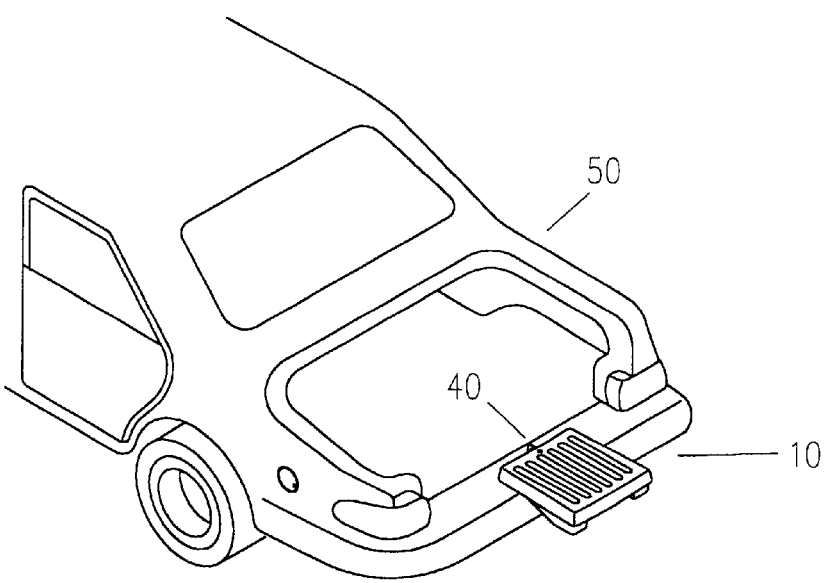
FIG. 4B is a perspective view of the portable seat assembly illustrating the trunk latch and the trunk of a typical vehicle after the connection of the portable seat assembly.

Lastly, FIG. 4A shows the present invention 10 before attachment to the trunk latch 40 of the vehicle 50. FIG. 5B shows the present invention 10 after attachment to the trunk latch 40 of the vehicle 50.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A portable seat assembly for removable attachment to a trunk latch of a vehicle, having a bumper comprising in combination:

a seat portion having an upper surface and a lower surface;

downwardly extending support connected to said seat portion allowing said downwardly extending support to rest on the bumper of the vehicle in a horizontal orientation;

an axial bore formed in said seat portion;

a boss positioned in said axial bore; and a hook operatively connected to said boss for connecting said seat portion to the trunk latch of the vehicle.

2. The portable seat assembly as set forth in claim 1, wherein said seat portion is integrally formed of a plastic material.

3. The portable seat assembly as set forth in claim 1, wherein said downwardly extending support further comprises a pair of downwardly extending repositionable supports, further comprising: a plurality of slots positioned on said downwardly extending supports; a plurality of vertical stiffeners positioned on said lower surface of said seat portion, said plurality of vertical stiffeners being alignable to at least one of said plurality of slots of said downwardly extending supports thereby allowing said downwardly extending supports to be repositioned along the length of said vertical stiffeners; said repositionable supports are locked into an appropriate position which gives more support to said portable seat assembly and insures the proper alignment of said seat to the trunk of the vehicle.

4. The portable seat assembly as set forth in claim 3, wherein said boss comprises an internally threaded boss.

5. The portable seat assembly as set forth in claim 4, wherein said hook further comprising:

a J-shape portion;

an externally threaded portion opposite to said J-shaped portion; and said externally thread portion of said hook is threadedly connected to said internally threaded boss.

6. The portable seat assembly as set forth in claim 5, wherein said hook is adjustable in position to allow for different height connections between the trunk latch of the vehicle and said seat portion.

7. The portable seat assembly as set forth in claim 6, wherein said hook is of a length to receive a lock washer and a standard nut.

8. The portable seat assembly as set forth in claim 7, wherein said upper surface of said seat portion further comprises a recess located at the top of said axial bore for receiving said boss.

9. The portable seat assembly as set forth in claim 8, wherein said boss is externally threaded and said standard nut threadedly connects to said threaded boss over said lock washer.

10. The portable seat assembly as set forth in claim 8, wherein said externally threaded portion of said hook is connected to a cap above said upper surface of said seat portion.

11. The portable seat assembly as set forth in claim 10, wherein said cap is internally threaded and is threadedly connected to said threaded portion of said hook above said upper surface of said seat portion.

12. The portable seat assembly as set forth in claim 11, wherein said hook, said cap, and said boss are manufactured out of a metal material.

13. The portable seat assembly as set forth in claim 11, wherein said hook, said cap, and said boss are manufactured out of a plastic material.

* * * * *